No. 848,140. PATENTED MAR. 26, 1907.
W. F. TOWNE.
STEERING WHEEL FOR AUTOVEHICLES.
APPLICATION FILED NOV. 8, 1906.

Witnesses:—
Isabel Hall.
Geneva L. Smith.

Inventor
William F. Towne.
By Townsend, Lyon, Hackley & King
his attys

UNITED STATES PATENT OFFICE.

WILLIAM F. TOWNE, OF LOS ANGELES, CALIFORNIA, ASSIGNOR OF ONE-HALF TO CHARLES R. SUMNER, OF LOS ANGELES, CALIFORNIA.

STEERING-WHEEL FOR AUTOVEHICLES.

No. 848,140.         Specification of Letters Patent.         Patented March 26, 1907.

Application filed November 8, 1906. Serial No. 342,570.

*To all whom it may concern:*

Be it known that I, WILLIAM F. TOWNE, a citizen of the United States, residing at Los Angeles, in the county of Los Angeles, State of California, have invented a new and useful Steering-Wheel for Autovehicles, of which the following is a specification.

The main object of the present invention is to provide a steering-wheel for automobiles and the like, with means for improving the grip or hold of the operator thereof.

The especial object of the invention is to provide means for firmly holding the wheel when it tends to turn violently, as when the automobile is running at a high speed and on a more or less rough road.

A further object of the invention is to provide such means in a convenient, simple, and cheap form.

Figure 1:
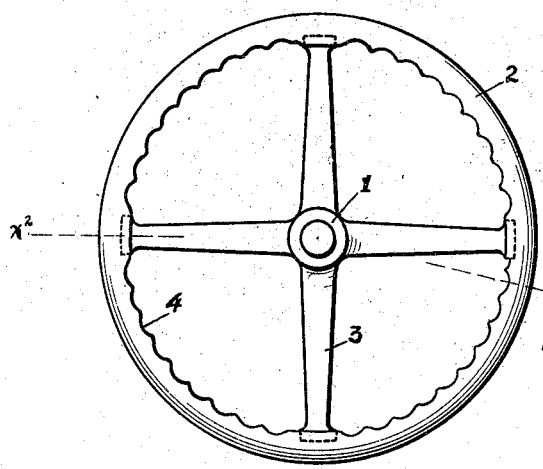
Figure 2:
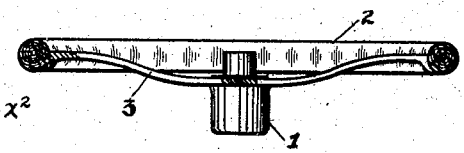
Figure 3:
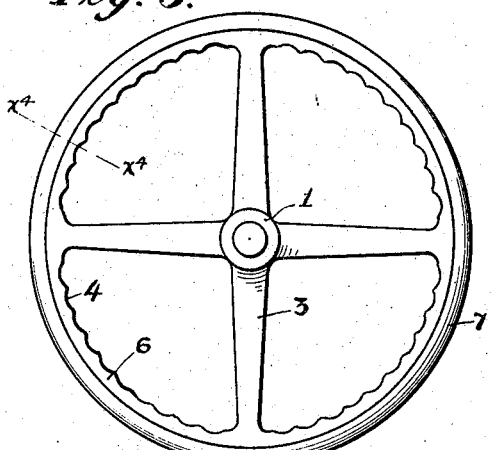
Figure 4:
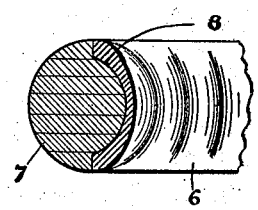
Figure 5:
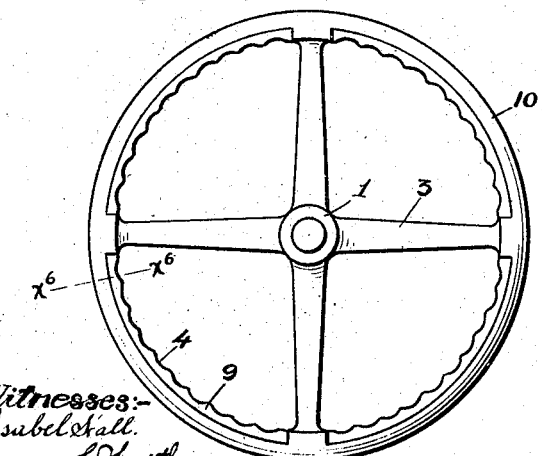
Figure 6:
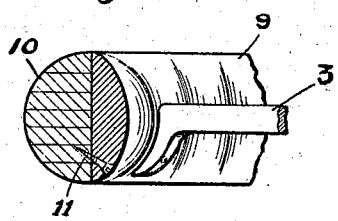

In the accompanying drawings, Figure 1 is a plan of one form of the invention. Fig. 2 is a section on line $x^2 x^2$, Fig. 1. Fig. 3 is a plan showing another form of the invention. Fig. 4 is a section thereof on line $x^4 x^4$. Fig. 5 is a plan of another form of the invention. Fig. 6 is a section on line $x^6 x^6$, Fig. 5.

Referring to Figs. 1 and 2, the steering-wheel comprises the usual hub 1, rim 2, and spoke 3, said rim being preferably of wood. On the inner face of said rim, preferably around the complete circumference thereof, are provided finger-grip means, consisting of notches or indentations 4, formed in said inner face. This rim is preferably the usual wooden rim and is circular, these notches being formed simply by indentations therein in the nature of scallops. In using the wheel the operator will in general grasp the wheel with his hands, mainly engaging the outer face; but in case of an emergency, such as in running on a rough road or at high speed, where the wheel is subject to a sudden jar or jolt due to swerving of the steering-wheels on striking an obstruction, the operator brings his fingers against the inner faces of the wheel, his fingers then engaging in the indentations 4 to tightly grip the wheel and hold the same from slipping. At the same time the palm of the hand rests against the smooth outer surface of the rim, thereby giving a smooth round surface to take the pressure of the palm and enabling the operator to use his hand in gripping to the best advantage. The scallops or indentations preferably extend all the way around the wheel, except at the spokes, so that whatever be the position of the wheel good gripping action will be insured.

In some cases it may be desirable to form the wheel, as shown in Figs. 3 and 4, with an inner metallic rim member 6, secured to or cast with the spokes 3 and supporting the wooden outer rim or member 7, said inner rim member being formed with a circumferential groove 8, in which the outer rim member engages. The outer rim member is built up in the usual manner, enabling it to be put in place in the groove. The indentations 4 are in this case formed in the inner rim member 6, which serves to take the violent strain on jolting of the wheels.

Figs. 5 and 6 show another form of the invention, wherein the indentations 4 are formed in a supporting metallic arc-shaped member 9, inserted in a wooden outer rim 10, which is secured to the spokes 3, as in Fig. 1, the metallic arc being fastened to the rim 10 by screws 11.

What I claim is—

1. A steering-wheel having a rim with a smooth outer surface and an indented inner surface for the purpose set forth.

2. A steering-wheel having a rim with a smooth outer surface and an indented inner surface to form a continuous finger-grip for turning the wheel.

3. A steering-wheel having a rim composed of inner and outer members, the outer member being supported in and by the inner member and having a smooth outer surface, and the inner member having an indented inner surface.

In testimony whereof I have hereunto set my hand, at Los Angeles, California, this 1st day of November, 1906.

WILLIAM F. TOWNE.

In presence of—
ARTHUR P. KNIGHT,
FRANK L. A. GRAHAM.